Jan. 20, 1959     A. P. FISCHER     2,869,378
VARIABLE SPEED DRIVE MECHANISM
Filed Jan. 9, 1956     2 Sheets-Sheet 2
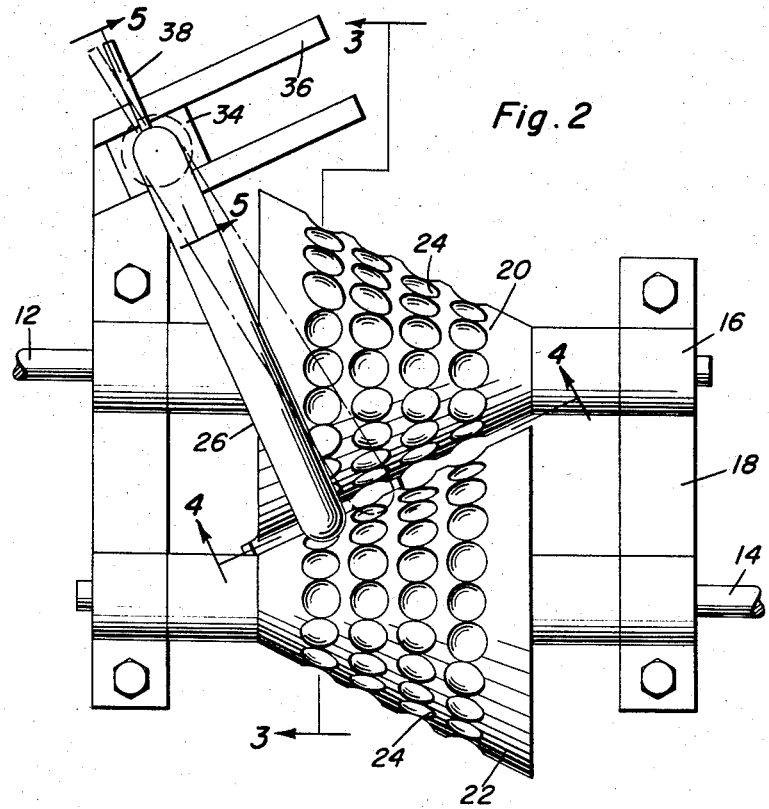
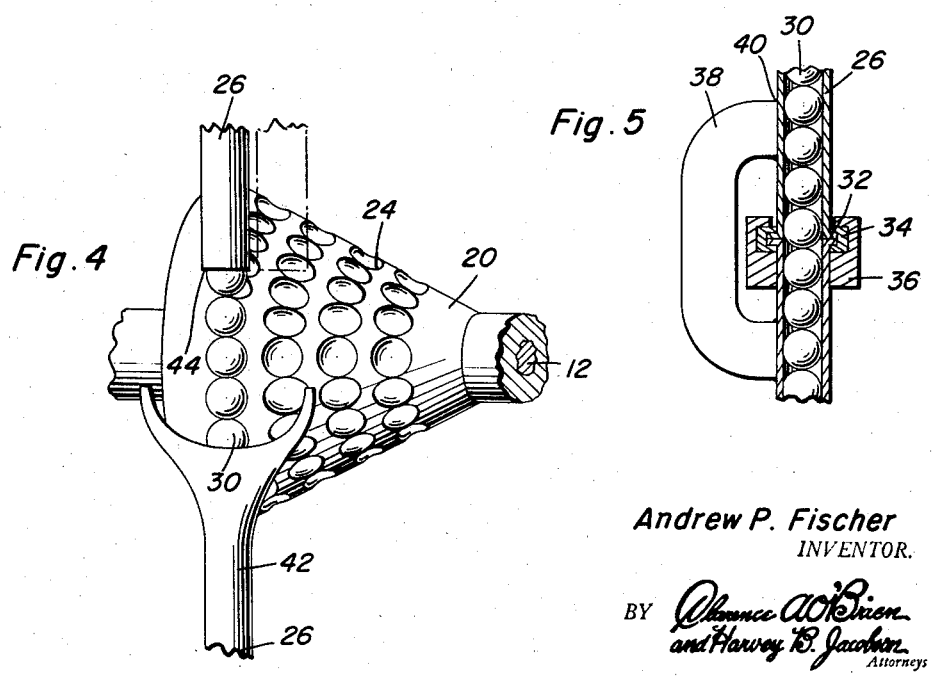
Andrew P. Fischer
INVENTOR.

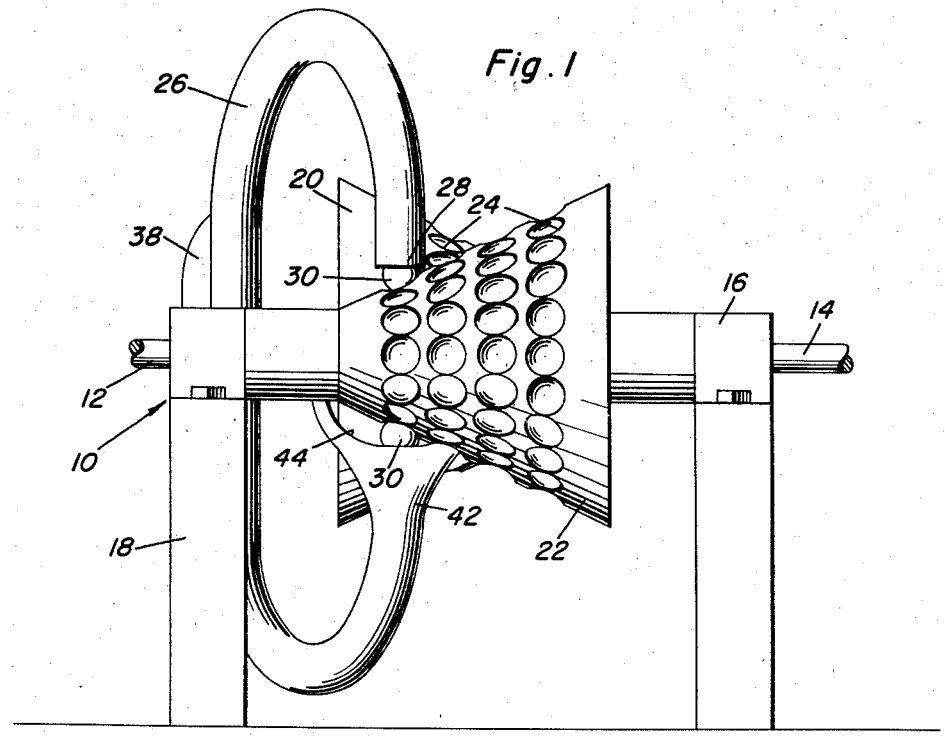
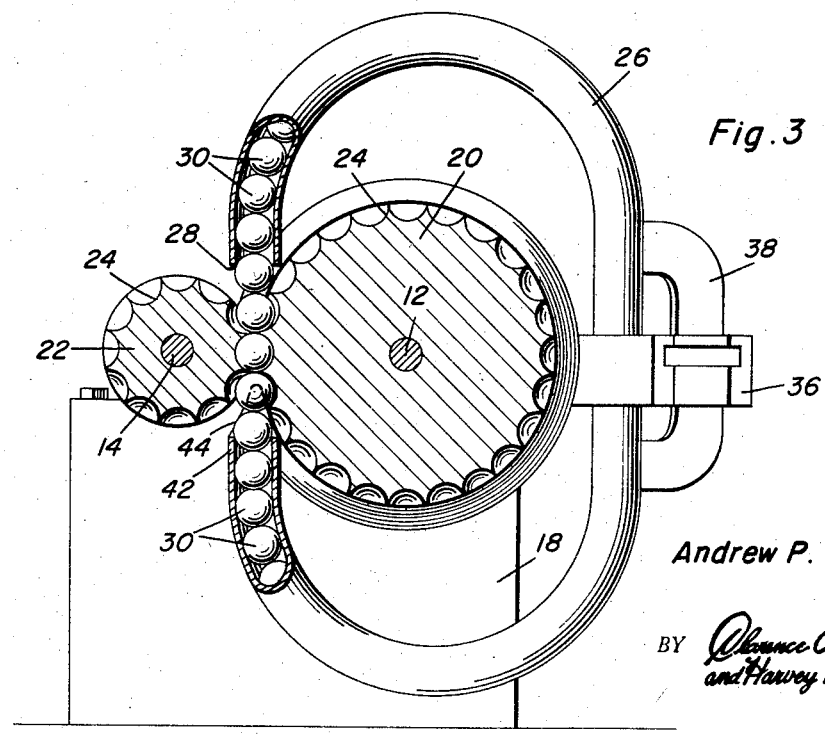

United States Patent Office 2,869,378
Patented Jan. 20, 1959

2,869,378

VARIABLE SPEED DRIVE MECHANISM

Andrew P. Fischer, Modesto, Calif.

Application January 9, 1956, Serial No. 558,020

4 Claims. (Cl. 74—216.3)

This invention generally relates to a power transmitting device and more specifically provides interconnecting means between a driving shaft and a driven shaft wherein the ratio of the rotational speeds thereof may be varied.

An object of the present invention is to provide a variable speed power transmitting mechanism including a pair of frusto-conical members arranged alongside of each other together with means interconnecting the peripheral surfaces of the conical members for positively interconnecting the surfaces and adjustable longitudinally of the conical members for varying the relative rotational speeds thereof.

A further important object of the present invention is to provide a variable speed drive mechanism in accordance with the preceding objects having spaced rows of circumferentially spaced semi-spherical indentations arranged on frusto-conical members together with a plurality of ball members for partial seating in the indentations in each frusto-conical member thereby positively transferring rotation and power from one of the frusto-conical members to the other of the frusto-conical members.

Yet another important feature of the present invention is to provide novel means for shifting the plurality of interconnecting ball members longitudinally between the frusto-conical members for varying the relative rotational speeds thereof.

Other important objects of the present invention will reside in its simplicity of construction, efficiency in operation, positive drive characteristics, adaptation for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the variable speed drive mechanism of the present invention;

Figure 2 is a top plan view of the construction of Figure 1;

Figure 3 is a transverse, vertical sectional view taken substantially upon a plane passing along section line 3—3 of Figure 2 illustrating the specific details of the semi-spherical indentations and the relationship of the tubular guide for the ball members;

Figure 4 is a detailed view taken substantially upon a plane passing along reference line 4—4 of Figure 2 illustrating the manner of shifting the ball members from one row of indentations to another row of indentations for varying the relative speeds of the frusto-conical members; and Figure 5 is a detailed sectional view taken substantially upon a plane passing along section line 5—5 of Figure 2 illustrating the construction of the tubular guide to permit movement of a portion thereof for changing the position of the ball members.

Referring now specifically to the drawings, the numeral 10 generally designates the variable speed drive mechanism of the present invention which includes a drive shaft 12 and a driven shaft 14 mounted in spaced parallel relation to each other and journaled in bearings 16 supported on suitable brackets 18 which have been generally schematically illustrated since the shafts 12 and 14 as well as the entire drive mechanism 10 may take many shapes and forms.

Rigidly attached to the driving shaft 12 is a frusto-conical member 20 and rigidly attached to the driven shaft 14 is a frusto-conical member 22 with the end of the frusto-conical member 20 having the major diameter being disposed remotely from the end of the frusto-conical member 22 having the major diameter. Accordingly, it will be seen that the periperal surfaces of the frusto-conical members 20 and 22 are aligned in parallel relation adjacent the point of contact between the frusto-conical members 20 and 22. It will be noted that the frusto-conical members 20 and 22 are slightly spaced from each other and maintain a positive relationship for a purpose described hereinafter.

Each of the frusto-conical members 20 and 22 includes a plurality of longitudinally spaced rows of circumferentially arranged indentations 24 which are generally semi-spherical in shape with the edges of each indentation 24 forming and terminating the edge of an adjacent indentation 24. The rows of indentations 24 are arranged in aligned relation substantially as illustrated in Figure 2.

A generally oval shaped tubular guide 26 is provided with a discharge end 28 disposed above and between the frusto-conical members 20 and 22 for discharging a plurality of spherical or ball members 30 into the indentations 24 substantially as illustrated in Figure 3 whereby the rotation of the driving frusto-conical member 20 will be transmitted to the driven frusto-conical member 22 for positively causing rotation of the frusto-conical member 22 in a definite ratio to the rotational speed of the driving frusto-conical member 20.

It will be noted that each row of indentations 24 includes a predetermined number of indentations which is direct multiple of the aligned rows of indentations whereby the indentations 24 will properly receive the ball members 30 discharged from the discharge end 28 of the tubular guide 26.

The tubular guide 26 is provided with a swivel joint 32 retained in assembled relation by a channel-shaped retainer 34 that slides in a channel-shaped guide 36 which is disposed parallel to the plane of adjacency of the frusto-conical members 20 and 22. A generally flat or leaf spring 38 of U-shaped configuration is integrally attached to the tubular guide 26 on each side of the swivel joint 32 as by welding 40 whereby the intake end 42 of the guide 26 will be urged to proper alignment under the discharge end 28 of the guide 26.

The inlet end 42 of the tubular guide 26 is provided with a U-shaped upper end 44 which is transversely elongated for bridging two rows of identations 24 whereby the balls received from the rows 24 will be calked into the tubular guide 26 during shifting of the discharge end 28 of the tubular guide 26 when changing the relative rotational speeds of the frusto-conical members 20 and 22.

In operation, the spherical balls 30 are disposed in the tubular guides 26 and the indentations 24 on the frusto-conical members 20 and 22 are of such a size to partially receive the ball members 30 in the circumferentially disposed indentations 24 in aligned rows thereof. Inasmuch as the radius of the ball members 30 and the indentations 24 are identical, a single ball member 30 will be disposed in aligned indentations 24 and due to the coacting concave surfaces of the indentations 24 and convexed periphery of the ball member 30, the rotational force of the driving frusto-conical member 20 will be positively transmitted to the driven frusto-conical member 22 for rotating the driven frusto-conical member 22 at a given speed. The U-shaped yoke 44 will collect and receive the ball members 30 as they are discharged from the aligned indentations 24 as the indentations move away from each other. The particular configuration of the U-shaped yoke 44 is such that it increases in width toward the center thereof so that subsequent ball members 30 will force the ball members 30 downwardly into the tubular guide 26 and upwardly through the swivel joint 34. As the ball members pass over the top of the oval shaped guide 26, they will fall downwardly by gravity into the discharge end 28. When it is desired to shift the relative speeds or change the relative speeds of the frusto-conical members 20 and 22, it is only necessary to grip or otherwise apply force to the upper end of the oval guide 26 for shifting the discharge end 28 longitudinally between the frusto-conical members 20 and 22 as illustrated in dotted line in Figures 2 and 4. This will cause the ball members 30 to be discharged into the next adjacent row of indentations 24 and the first ball discharged into the next adjacent row of indentations 24 will, of course, be received in the next succeeding pair of indentations 24 whereby it will not be discharged until such time as the last ball has been discharged from the preceding row of indentations 24. Due to the particular arrangement of the yoke 44 in relation to the ball members as they are being discharged, the yoke 44 will not move until the last ball is received from the preceding row of indentations 24 at which time the spring 38 will urge the yoke 44 to bring the inlet end 42 of the tubular guide 26 in alignment with the next adjacent row of indentations 24. Therefore, the tubular guide 26 may be shifted longitudinally of the frusto-conical members 20 and 22 and the retainer 34 of the swivel joint 32 may be shifted longitudinally in the channel shaped guide 26 to assure proper orientation of the discharge end 28 of the tubular guide 26 with the frusto-conical members 20 and 22 and the indentations 24 therein. The present device provides a variable speed power transmitting device which is positive in operation but retains all of the advantages of simplicity and ease of operation without losses due to slippage of frictional power transmitting devices.

While the specific embodiment of the invention has been illustrated and described as including parallel shafts and frusto-conical members with spherical balls forming the positive driving connection, it will be understood that any number of shapes may be employed and the shafts may be arranged in any angular relation. Also, other shapes of interconnecting members may be provided in lieu of the spherical balls as long as a suitable tubular guide is provided to retain and guide them. The members on one of the shafts may have a longitudinal concave surface while the member on the other shaft may have a convex surface or the one shaft may have a plate or disc on the end thereof with the other shaft being arranged perpendicularly thereto with a cylindrical member thereon with the interconnecting members disposed between the outer face of the disc and the periphery of the cylindrical member.

What is claimed as new is as follows:

1. A power transmitting device comprising a driving and driven shaft arranged in spaced parallel relation, a frusto-conical member on each shaft with the major diameter of one member disposed in alignment with the minor diameter of the other member whereby the adjacent peripheral surfaces are parallel to each other, and positive means interconnecting said members for transmitting power without slippage, said means being adapted for movement along the space formed by the adjacent peripheral surfaces of said frusto-conical members and further adapted to swivel about an axis perpendicular to and laterally spaced from the axis of rotation of the shafts and the path of movement of the positive interconnecting means for varying the ratio of the speed of rotation of the driven shaft in relation to the speed of rotation of the driving shaft, each of said frusto-conical members having longitudinally spaced parallel rows of circumferentially arranged indentations of substantially semi-spherical shape, said interconnecting means including a plurality of ball members, and a tubular guide for said ball members for guiding the ball members into said indentations with a portion of the ball members being disposed in the indentations in each frusto-conical member for positively interconnecting said frusto-conical members.

2. A power transmitting device comprising a driving and driven shaft arranged in spaced parallel relation, a frusto-conical member on each shaft with the major diameter of one member disposed in alignment with the minor diameter of the other member whereby the adjacent peripheral surfaces are parallel to each other, and positive means interconnecting said members for transmitting power without slippage, said means being adapted for movement along the space formed by the adjacent peripheral surfaces of said frusto-conical members and further adapted to swivel about an axis perpendicular to and laterally spaced from the axis of rotation of the shafts and the path of movement of the positive interconnecting means for varying the ratio of the speed of rotation of the driven shaft in relation to the speed of rotation of the driving shaft, each of said frusto-conical members having longitudinally spaced parallel rows of circumferentially arranged indentations of substantially semi-spherical shape, said interconnecting means including a plurality of ball members, and a tubular guide for said ball members for guiding the ball members into said indentations with a portion of the ball members being disposed in the indentations in each frusto-conical member for positively interconnecting said frusto-conical members, said indentations having the same radius of curvature as said ball members with the edges of adjacent indentations in each row being coincident, and means for shifting said guide for directing ball members through selective rows of indentations for varying the relative rotational speeds of said frusto-conical members.

3. A power transmitting device comprising a driving and driven shaft arranged in spaced parallel relation, a frusto-conical member on each shaft with the major diameter of one member disposed in alignment with the minor diameter of the other member whereby the adjacent peripheral surfaces are parallel to each other, and positive means interconnecting said members for transmitting power without slippage, said means being adapted for movement along the space formed by the adjacent peripheral surfaces of said frusto-conical members and further adapted to swivel about an axis perpendicular to and laterally spaced from the axis of rotation of the shafts and the path of movement of the positive interconnecting means for varying the ratio of the speed of rotation of the driven shaft in relation to the speed of rotation of the driving shaft, each of said frusto-conical members having longitudinally spaced parallel rows of circumferentially arranged indentations of substantially semi-spherical shape, said interconnecting means including a plurality of ball members, and a tubular guide for said ball members for guiding the ball members into said indentations with a portion of the ball members being disposed in the indentations to each frusto-conical member for positively interconnecting said frusto-conical members, said indentations having the same radius of curvature as said ball members with the edges of adjacent indentations in each row being coincident, and means for shifting said guide for directing ball members through selective rows of indentations for varying the relative rotational speeds of said frusto-conical members, said shifting means including a channel-shaped guide arranged in parallel relation to the line of juncture between the frusto-conical members, said ball guide being generally oval-shaped having spaced ends arranged on opposite sides of said frusto-conical members for discharging balls into said indentations and receiving balls therefrom, said ball guide having a swivel joint therein in opposition to said spaced ends, said swivel joint including a retainer slidably mounted in said channel-shaped guide.

4. A power transmitting device comprising a driving and driven shaft arranged in spaced parallel relation, a frusto-conical member on each shaft with the major diameter of one member disposed in alignment with the minor diameter of the other member whereby the adjacent peripheral surfaces are parallel to each other, and positive means interconnecting said members for transmitting power without slippage, said means being adapted for movement along the space formed by the adjacent peripheral surfaces of said frusto-conical members and further adapted to swivel about an axis perpendicular to and laterally spaced from the axis of rotation of the shafts and the path of movement of the positive interconnecting means for varying the ratio of the speed of rotation of the driven shaft in relation to the speed of rotation of the driving shaft, each of said frusto-conical members having longitudinally spaced parallel rows of circumferentially arranged indentations of substantially semi-spherical shape, said interconnecting means including a plurality of ball members, and a tubular guide for said ball members for guiding the ball members into said indentations with a portion of the ball members being disposed in the indentations of each frusto-conical member for positively interconnecting said frusto-conical members, said indentations having the same radius of curvature as said ball members with the edges of adjacent indentations in each row being coincident, and means for shifting said guide for directing ball members through selective rows of indentations for varying the relative rotational speeds of said frusto-conical members, said shifting means including a channel-shaped guide arranged in parallel relation to the line of juncture between the frusto-conical members, said ball guide being generally oval-shaped having spaced ends arranged on opposite sides of said frusto-conical members for discharging balls into said indentations and receiving balls therefrom, said ball guide having a swivel joint therein in opposition to said spaced ends, said swivel joint including a retainer slidably mounted in said channel-shaped guide, said swivel joint including means for resiliently retaining said free ends of the ball guide in alignment to permit shifting of the balls from one row of indentations to another row of indentations.

References Cited in the file of this patent

UNITED STATES PATENTS

| | | |
|---|---|---|
| 760,460 | Leighton | May 24, 1904 |
| 2,461,258 | Brooks | Feb. 8, 1949 |
| 2,744,414 | Alexeev | May 8, 1954 |

FOREIGN PATENTS

| | | |
|---|---|---|
| 294,080 | Great Britain | July 19, 1928 |